(12) United States Patent
Takahashi (10) Patent No.: US 7,901,141 B2
(45) Date of Patent: Mar. 8, 2011

(54) HUB UNIT BEARING (75) Inventor: Akira Takahashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 529 days.

(21) Appl. No.: 11/816,184

(22) PCT Filed: Feb. 13, 2006

(86) PCT No.: PCT/JP2006/302472

§ 371 (c)(1),
(2), (4) Date: Aug. 14, 2007

(87) PCT Pub. No.: WO2006/085651

PCT Pub. Date: Aug. 17, 2006

(65) Prior Publication Data

US 2009/0010581 A1    Jan. 8, 2009

(30) Foreign Application Priority Data

Feb. 14, 2005 (JP) ............................. 2005-036274
Feb. 14, 2005 (JP) ............................. 2005-036275

(51) Int. Cl.
F16C 41/04 (2006.01)
F16C 32/00 (2006.01)
F16C 33/72 (2006.01)

(52) U.S. Cl. ...................... 384/448; 384/537; 384/544; 384/482

(58) Field of Classification Search ................ 384/448, 384/482–486, 537, 544, 548; 277/551, 560, 277/562

See application file for complete search history.

(56) References Cited

U.S. PATENT DOCUMENTS

| 5,947,611 | A  | * | 9/1999  | Nagase ................... 384/448 |
| 6,206,380 | B1 | * | 3/2001  | Miyazaki ................ 277/551 |
| 6,692,153 | B2 | * | 2/2004  | Ohtsuki et al. ........... 384/448 |
| 7,056,028 | B2 | * | 6/2006  | Hosoda et al. ........... 384/482 |
| 2004/0105603 | A1 | * | 6/2004  | Ohtsuki et al. ........... 384/448 |
| 2004/0179760 | A1 | * | 9/2004  | Nakajima et al. ......... 384/448 |
| 2005/0259902 | A1 | * | 11/2005 | Ohtsuki et al. ........... 384/448 |
| 2006/0245936 | A1 | * | 11/2006 | Shibata et al. ........... 417/223 |

FOREIGN PATENT DOCUMENTS

| EP | 337893 A1 | * | 10/1989 |
| EP | 1041387 A1 | * | 10/2000 |
| EP | 1548307 A1 | * | 6/2005 |
| GB | 2259987 A | * | 3/1993 |
| JP | 61081473 A | * | 4/1986 |
| JP | 10-153607 A |   | 6/1998 |
| JP | 2000-266068 A |   | 9/2000 |
| JP | 2001-349331 A |   | 12/2001 |
| JP | 2002-139057 A |   | 5/2002 |

(Continued)

Primary Examiner—Marcus Charles
(74) Attorney, Agent, or Firm—Sughrue Mion, PLLC (57) ABSTRACT

A sealing device 12b of a hub unit bearing O has a first slinger 16 fixed to an inner ring 5, a second slinger 17 fixed to an outer ring 1, and a sealing portion 18 which is fixed to the first slinger 16 and is slide-contacted with the second slinger 17. A magnetic encoder 20 is fixed to the first slinger 16. The magnetic encoder 20 and the sealing portion 18 are bond-fixed to the first slinger 16 with the same adhesive agent.

4 Claims, 12 Drawing Sheets

FOREIGN PATENT DOCUMENTS

| | | | | |
|---|---|---|---|---|
| JP | 2003074568 A | * | 3/2003 | |
| JP | 2003294046 A | * | 10/2003 | |
| JP | 2004060751 A | * | 2/2004 | |
| JP | 2004-85534 A | | 3/2004 | |
| JP | 2005009632 A | * | 1/2005 | |
| JP | 2005291307 A | * | 10/2005 | |
| JP | 2006234006 A | * | 9/2006 | |

* cited by examiner

HUB UNIT BEARING

TECHNICAL FIELD

The present invention relates to a hub unit bearing for supporting a wheel of, for example, an automobile rotatably relative to a suspension system.

BACKGROUND ART

A sealing device of a hub unit bearing is provided at both axial end portions of the fixed ring and the rotating ring of the bearing. The sealing device prevents leakage of grease sealed in a bearing space and also prevents dust, water, and mud from entering the bearing space (see, for example, Patent Document 1).

Figure 12:
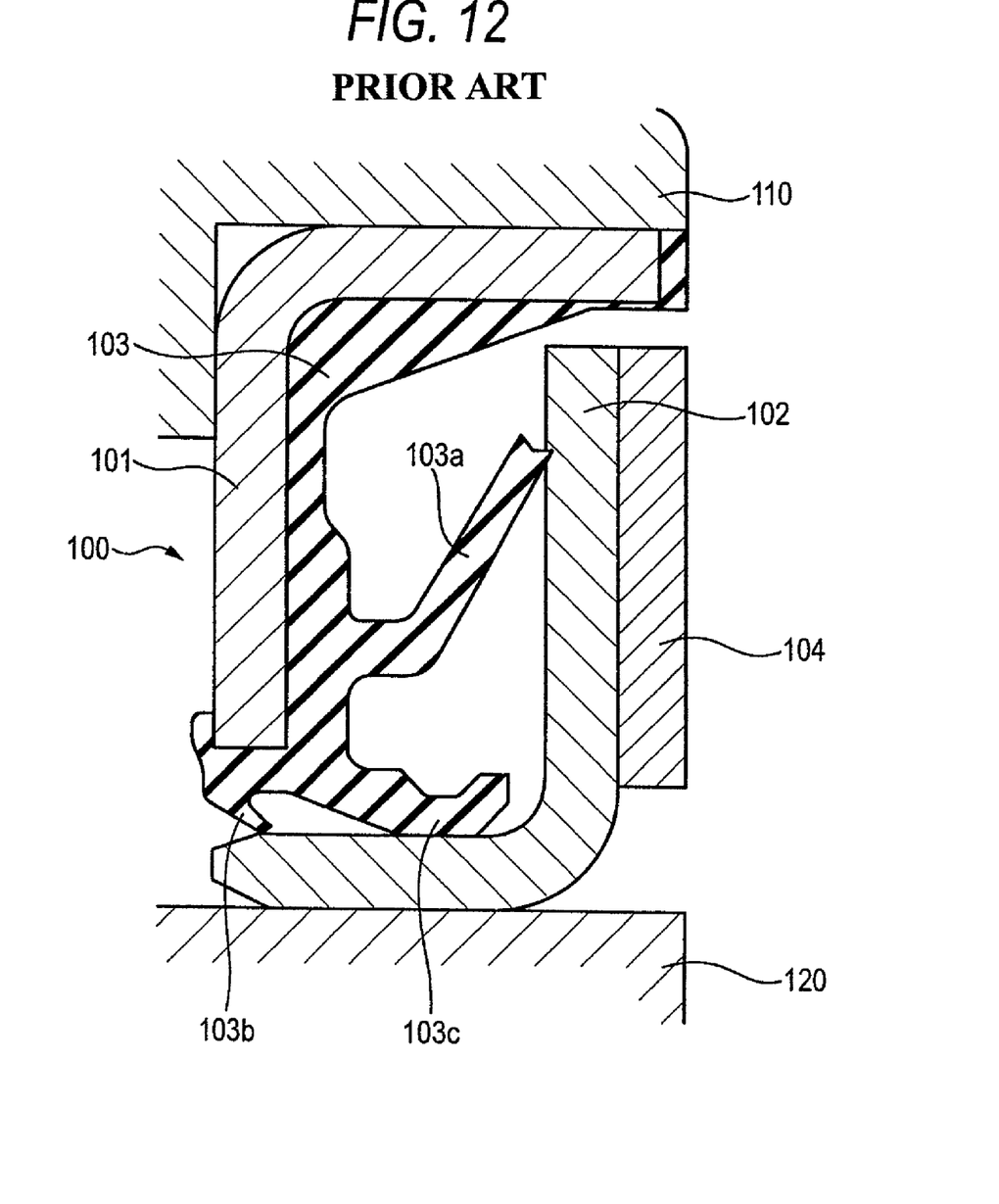
FIG. 12 is a main part cross-sectional view illustrating a sealing device of a conventional hub unit bearing.

For example, as illustrated in FIG. 12, a conventional sealing device 100 has an L-shaped slinger 101 to be fit onto the inner circumferential surface of an end portion of a fixed ring 110, an L-shaped slinger 102 to be fit onto the outer circumferential surface of an end portion of a rotating ring 120, and a sealing portion 103 which is bond-fixed to the slinger 101 and is slide-contacted with the slinger 192. The sealing portion 103 has an axial lip 103a slide-contacted axially with the slinger 102, and also has two radial lips 103b and 103c slide-contacted radially with the slinger 102. Also, in recent years, sealing devices have been increased, which are configured so that a magnetic encoder (e.g., a rubber magnet) 104 used as a sensor for an ABS of a vehicle is bond-fixed to a bearing outer side surface of the slinger 102 fit onto the outer circumferential surface of the rotating ring 110.

Patent Document 1: JP-A-2002-139057

DISCLOSURE OF THE INVENTION

Problems that the Invention is to Solve

Meanwhile, in the conventional sealing device 100, the sealing portion 103 is mold-bonded to one 101 of the slingers. The magnetic encoder 104 is mold-bonded to the other slinger 102. Thus, it is necessary to process each of the two slingers 101 and 102 and to individually mold-bond the sealing portion 103 and the magnetic encoder 104.

The invention is accomplished in view of the above circumstances. An object of the invention is to provide a hub unit bearing having a sealing device whose shape is free from the disposition of a magnetic encoder.

Means for Solving the Problems

The object of the invention is achieved by the following configurations.

(1) A hub unit bearing having a rotating ring, a fixed ring, a plurality of rolling elements rollably disposed in an annular space between the rotating ring and the fixed ring, a sealing device configured to seal the annular space, and a magnetic encoder configured to rotate together with the rotating ring. Wherein the sealing device has a first slinger fixed to the rotating ring, a second slinger fixed to the fixed ring, and a rotating-side sealing portion which is fixed to the first slinger and which is slide-contacted with the second slinger, that the magnetic encoder is fixed to the first slinger, and that the magnetic encoder and the rotating-side sealing portion are bond-fixed to the first slinger with the same adhesive agent.

(2) The hub unit bearing according to (1), wherein the sealing device further has a fixed-side sealing portion which is fixed to the second slinger and which is slide-contacted with the first slinger.

(3) The hub unit bearing according to (1) or (2), wherein the magnetic encoder is made of rubber or a resin material, and the adhesive agent is a phenolic vulcanized adhesive agent.

(4) A method for manufacturing a hub unit bearing according to one of (1) to (3), wherein the magnetic encoder and the rotating-side sealing portion are simultaneously molded on the first slinger.

(5) The method for manufacturing a hub unit bearing according to one of (1) to (3), wherein the magnetic encoder and the rotating-side sealing portion are formed by an injection method or a compression method.

ADVANTAGES OF THE INVENTION

According to the invention, the hub unit bearing is configured so that the sealing device has the first slinger fixed to the rotating ring, the second slinger fixed to the fixed ring, and the rotating-side sealing portion which is fixed to the first slinger and is slide-contacted with the second slinger, and that the magnetic encoder is bond-fixed to the first slinger. Thus, the sealing device has a shape which is free from the disposition of the magnetic encoder.

Particularly, when the rotating-side sealing portion is fixed only to the first slinger to which the magnetic encoder is fixed, it becomes not need to processing the second slinger. Thus, the manufacturing cost can be reduced. Also, the magnetic encoder and the rotating-side sealing portion can be bond-fixed to the first slinger with the same adhesive agent. Thus, the manufacturing cost can be further reduced.

Additionally, the sealing device further has the fixed-side sealing portion which is fixed to the second slinger and is slide-contacted with the first slinger. Thus, the cross-sectional space of the sealing device can effectively be utilized. The number of lips can be increased. Consequently, the sealability of the sealing device can be enhanced.

Also, because the magnetic encoder and the rotating sealing portion are bond-fixed to the first slinger with the same adhesive agent, the rotating-side sealing portion and the magnetic encoder can simultaneously be mold-bonded to the first slinger. Consequently, the number of manufacturing steps can be prevented from being increased due to the bond-fixing of the rotating-side sealing portion to the first slinger. Thus, the manufacturing cost can be suppressed from being increased.

DESCRIPTION OF REFERENCE NUMERALS AND SIGNS 1 outer ring (fixed ring)
3 hub (rotating ring)
4 hub ring (rotating ring)
5 inner ring (rotating ring)
10 rolling element
12a, 12b, 12c sealing devices
16 first slinger
17 second slinger
18, 28 rotating-side sealing portions
20 magnetic encoder
29 fixed-side sealing portion

BEST MODE FOR CARRYING OUT THE INVENTION

Hereinafter, a hub unit bearing according to each embodiment of the invention is described in detail with reference to the accompanying drawings.

First Embodiment

Figure 1:
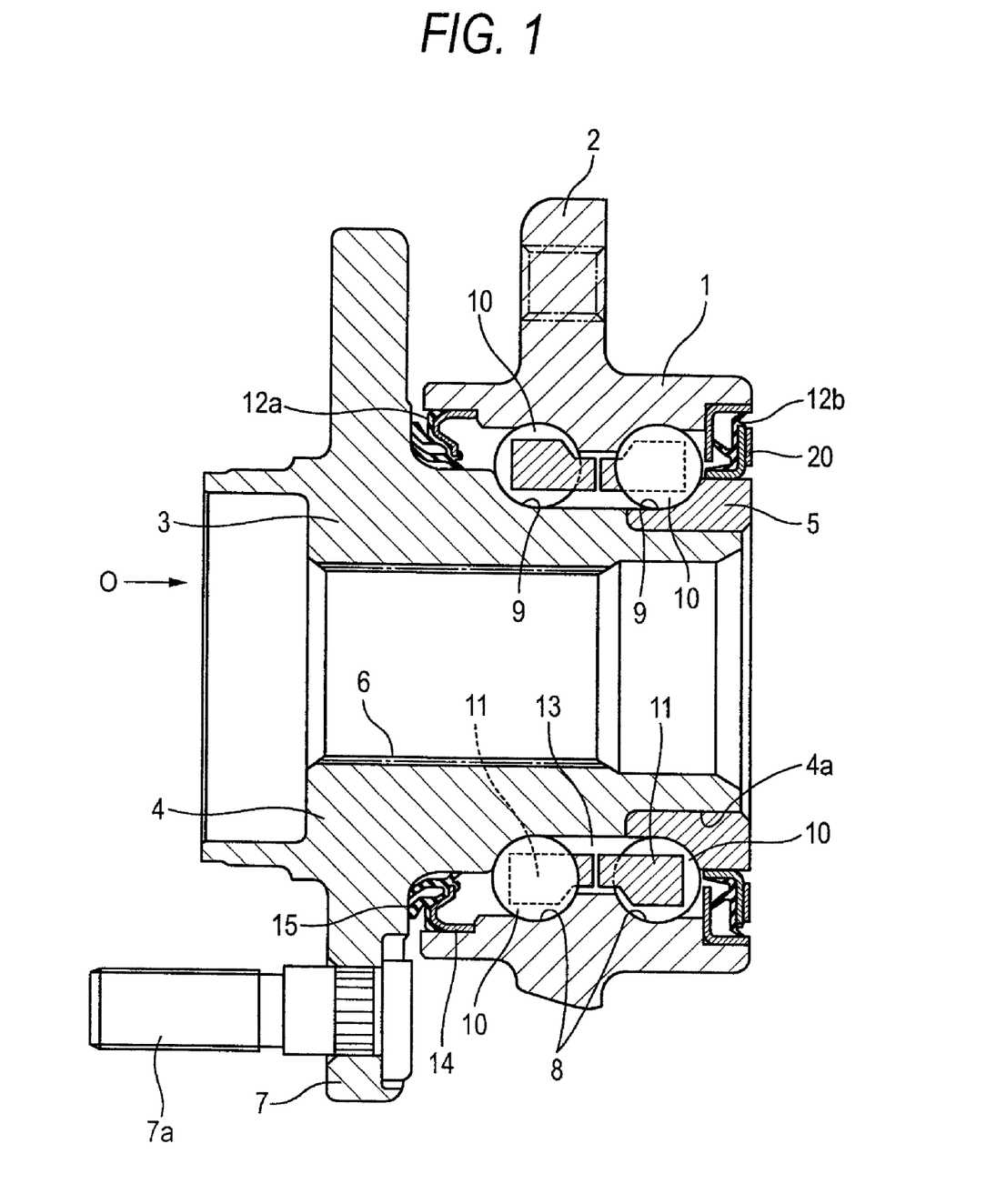
FIG. 1 is a cross-sectional view illustrating a hub unit bearing which is a first embodiment of the invention.

As illustrated in FIG. 1, a hub unit bearing O according to a first embodiment is used for driving-wheels and has an outer ring 1 serving as a fixed ring, a hub 3 serving as a rotating ring, a plurality of rolling elements 10 reliably disposed in an annular space 13 between the outer ring 1 and the hub 3, sealing devices 12a and 12b which seal the annular space 13, and a magnetic encoder 20 which rotates together with the hub 3.

The hub 3 has a hollow hub ring 4. The hub ring 4 has a wheel mounting flange 7 that is provided at an outboard-side end portion of an outer circumferential surface of the hub ring 4 (i.e., an end portion provided at an outer side in the direction of a vehicle width in a state in which the hub unit bearing is assembled to an automobile: a left end portion, as viewed in FIG. 1) and that extends radially outwardly therefrom. A plurality of studs 7a for mounting a wheel and a brake rotor, which constitute a wheel, on an outboard-side surface of the wheel mounting flange 7 are implanted in a side surface thereof substantially at uniform intervals in a circumferential direction.

A small diameter step-like portion 4a is formed on an inboard-side end portion (i.e., an end portion provided at an inner side in the direction of the vehicle width in a state in which the hub is assembled to the automobile: a right end portion, as viewed in FIG. 1) of the hub ring 4. An inner ring 5 is fit into the small diameter step-like portion 4a. An inner ring raceway surface 9 is formed on an outer circumferential surface of the inner ring 5. Also, an inner ring raceway surface 9 is formed on an outer circumferential surface of an intermediate part in the axial direction of the hub ring 4.

An outer ring raceway surface 8 corresponding to the inner ring raceway surface 9 of the hub ring 4, and an outer ring raceway surface 8 corresponding to the inner ring raceway surface 9 of the inner ring 5 are formed on an inner circumferential surface of the outer ring 1. Also, a suspension system mounting flange 2 extending outwardly radially is provided at an end portion of the outer ring 1, which is placed at the side separated from the wheel mounting flange 7.

Then, a plurality of rolling elements 10 are disposed rollably in a circumferential direction through ball retainers 11 between double-row inner ring raceway surfaces 9 and double-row outer ring raceway surfaces 8. Incidentally, although balls are used as the rolling elements 10 in the illustrated example, tapered rollers can be used as the rolling elements 10 in the case of a wheel supporting hub unit bearing having a mounting weight.

To assemble the aforementioned hub unit bearing O to the automobile, the suspension system mounting flange 2 of the rotating-ring-side outer ring 1 is fixed to the suspensions system. The brake rotor and the wheel are fixed to the wheel mounting flange 7 of the rotating-ring-side hub 3 through the studs 7a and nuts (not shown). Consequently, the wheel can be rotatably supported relative to the suspension system.

The sealing devices 12a and 12b are provided between the outboard-side end portion of the outer ring 1 and the hub ring 4 and between the inboard-side end portion of the outer ring 1 and the inner ring 5, respectively.

The sealing device 12a has a slinger 14 fit into the inner circumferential surface of the outboard-side end portion of the outer ring 1, and a sealing portion 15 which is bond-fixed to the slinger 14 and is slide-contacted with the hub ring 4.

Figure 2:
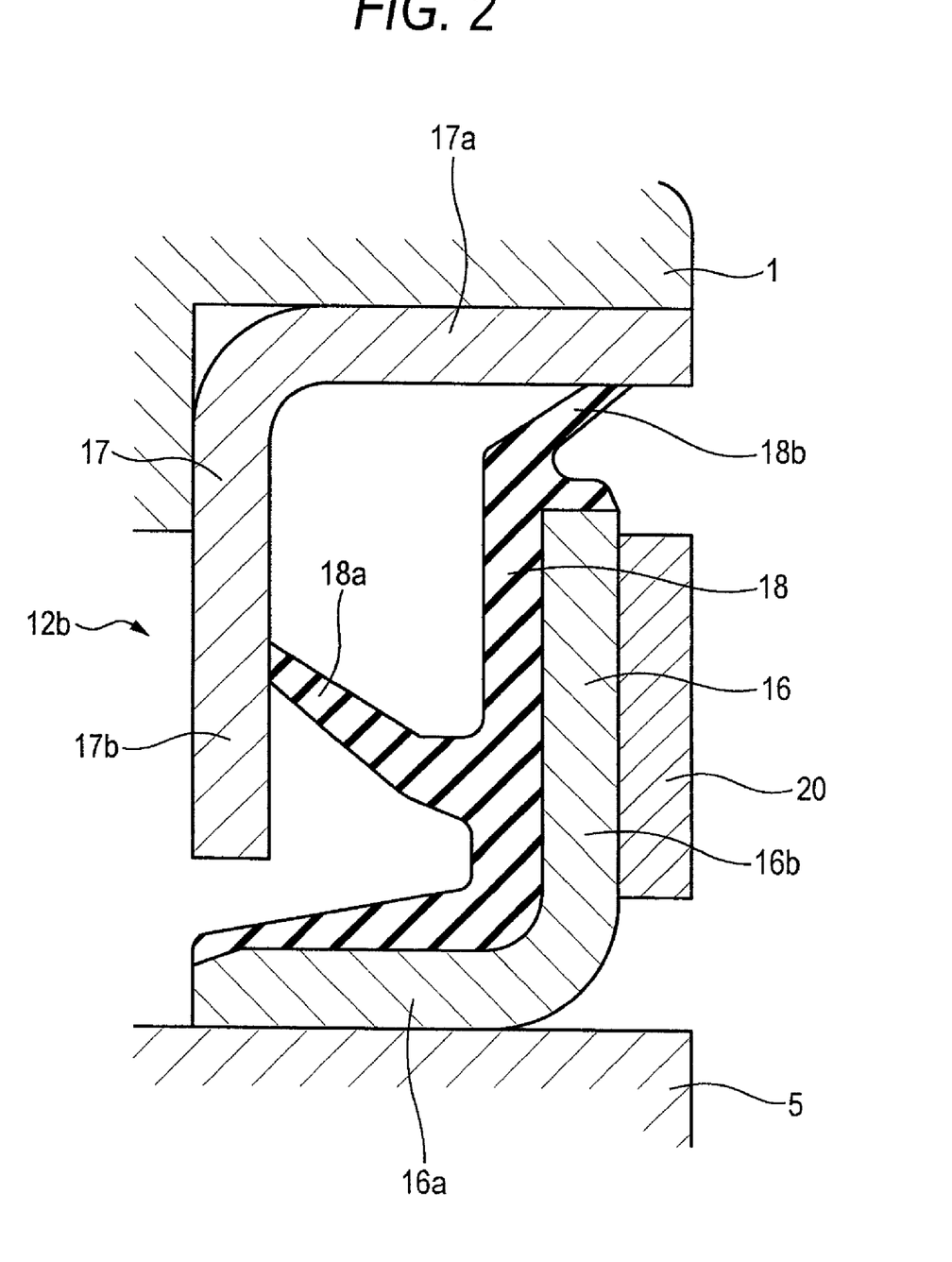
FIG. 2 is a main part cross-sectional view illustrating a sealing device of the hub unit bearing according to the first embodiment of the invention.

On the other hand, as illustrated in FIG. 2, the sealing device 12b has a first slinger 16 fit onto the outer circumferential surface of the inner ring 5, a second slinger 17 fit into the inner circumferential surface of the inboard-side end portion of the outer ring 1, and a rotating-side sealing portion 18 which is bond-fixed to the first slinger 16 and is slide-contacted with the second slinger 17.

The first slinger 16 has a cylindrical portion 16a which is fit onto the outer circumferential surface of the inner ring 5, and an annular flange portion 16b extending radially outwardly from an axial outer end edge (i.e., a right end edge, as viewed in FIG. 2) of this cylindrical portion 16a. The first slinger 16 is cross-sectionally L-shaped.

On the other hand, the second slinger 17 has a cylindrical portion 17a which is fit into the inner circumferential surface of the inboard-side end portion of the outer ring 1, and an annular flange portion 17b extending radially inwardly from an axial outer end edge (i.e., a left end edge, as viewed in FIG. 2) of this cylindrical portion 17a. The second slinger 17 is cross-sectionally L-shaped.

The rotating-side sealing portion 18 is formed of a rubber material, and has a single axial lip 18a axially slide-contacted with the second slinger 17, and a single radial lip 18b radially slide-contacted with the second slinger 17. Additionally, an end edge of the axial lip 18a is brought into sliding contact with the inner surface of the flange portion 17b of the second slinger 17. Also, an end edge of the radial lip 18b is brought into sliding contact with the inner circumferential surface of the cylindrical portion 17a of the second slinger 17. Consequently, leakage of the sealed grease sealed is prevented. Additionally, dust, water, and mud are prevented from externally entering the bearing space 13. The axial lip 18a is formed to be radially outwardly inclined towards an end thereof. The radial lip 18b is formed to be axially outwardly inclined toward an end thereof.

Also, a magnetic encoder 20 serving as a sensor for ABS of a vehicle is bond-fixed to the axial outer side surface of the flange portion 16b of the first slinger 16. The magnetic encoder 20 is rotated in synchronization with the rotation of the wheel. A change in a magnetic field, which is synchronized with the rotation of the wheel, is detected by a detection portion (not shown).

Incidentally, the magnetic encoder 20 and the rotating-side sealing portion 1S, which are bond-fixed to the first slinger 16, are simultaneously formed using the associated materials, respectively. The bonding of each of the magnetic encoder 20 and the rotating-side sealing portion 18 is performed using the same adhesive agent to be preliminarily made to adhere to (e.g., coated onto, sprayed onto, or baked, after the coating, onto) a surface of the first slinger 16. Further, a single layer or several layers of made of several kinds of adhesive agents in this case are made to adhere to the surface of the first slinger 16. However, the same kind of the adhesive agent is used over the entire surface of the first slinger together with the magnetic encoder 20 and the rotating-side sealing portion 18.

In a case where the magnetic encoder 20 is made of rubber or a resin (e.g., a nylon-based binder), a preferable kind of an adhesive agent is a phenolic vulcanized adhesive agent. It is often that the rubber employed as the material of the rotating-side sealing portion 18 and the rubber employed as the binder of the rubber magnet of the magnetic encoder 20 are of the same kind. The phenolic adhesive agent interacts with (or reacts to) the nylon-based binder having an amide group. At the vulcanization of the rubber, the phenolic adhesive agent can be used for the bonding.

Further, in a case where the magnetic encoder 20 is made of a metal, an epoxy resin is usually used as a binder. Therefore, preferably, the adhesive agent is an epoxy-based adhesive agent.

Both of a method of forming the magnetic encoder 20 and a method of forming the rotating-side sealing portion 18 can be either an injection method or a compression method. Alternatively, different forming methods can be employed as the method of forming the magnetic encoder 20 and the method of forming the rotating-side sealing portion 18, respectively (e.g., the magnetic encoder 20 is formed by the compression method, while the rotating-side sealing portion 18 is formed by the injection method, and vice versa). Alternatively, a method of bonding the preliminarily formed magnetic encoder 20 to the first slinger 16, simultaneously with the forming of the rotating-side sealing portion 18, can be employed. Although a gap is provided between the magnetic encoder 20 and the rotating-side sealing portion 18, as shown in FIG. 2, this gap is not indispensable.

Incidentally, when the magnetic encoder 20 is fixed, a technique (e.g., shot peening) of increasing the roughness of a bonding surface can be performed to the first slinger 16 to which the magnetic encoder 20 is bond-fixed so as to further strengthen the bonding of the magnetic encoder 20 to the first slinger 16. In this case, both of a surface, to which the magnetic encoder 104 is bonded, and a surface, on which the sealing portion 103 slides, are present on the conventional slinger 102 shown in FIG. 6. Thus, it is necessary to selectively roughen only the surface to which the magnetic encoder 104 is bonded. This has a problem in that parts management is complicated, with increase in the number of man-hours, to impede reduction in the manufacturing cost. However, no sliding surface is present on the surface of the first slinger 16. Thus, the particular management of selectively roughen a part of the surface of the first slinger 16 is unnecessary.

Accordingly, according to the present embodiment, the sealing device 12b has the first slinger 16 fixed to the inner ring 5, the second slinger 17 fixed to the outer ring 1, and the rotating-side sealing portion 18 which is fixed to the first slinger 16 and is slide-contacted with the second slinger 17. The magnetic encoder 20 is bond-fixed to the first slinger 16. Thus, the hub unit bearing O is realized, which has the sealing devices each of which has a shape that is free from the disposition of the magnetic encoder.

Particularly, in a case where the rotating-side sealing portion 18 is fixed only to the first slinger 16 to which the magnetic encoder 20 is fixed, the necessity for processing the second slinger 17 is eliminated. Thus, the manufacturing cost can be reduced. Further, the magnetic encoder 20 and the rotating-side sealing portion 18 are bond-fixed to the first slinger 16 with the same adhesive agent. Consequently, the rotating-side sealing portion 18 and the magnetic encoder 20 can simultaneously be mold-bonded to each other. Accordingly, the manufacturing cost can further be deleted.

The rotating-side sealing portion 18 fixed to the first slinger 16 is brought into slide contact with the second slinger 17. In a case where the roughness of the bonding surface of the magnetic encoder 20 fixed to the first slinger 16 is increased, the particular management of, for example, selectively roughening a part of the surface of the first slinger 16 is unnecessary. In this respect, the manufacturing cost can be reduced.

Incidentally, the description of the first embodiment has exemplified the rotating-side sealing portion 18 provided with the single axial lip 18a and the single radial lip 18b. However, the number of lips of the sealing portion and the shape of each of the lips can variously be changed.

Figure 3:
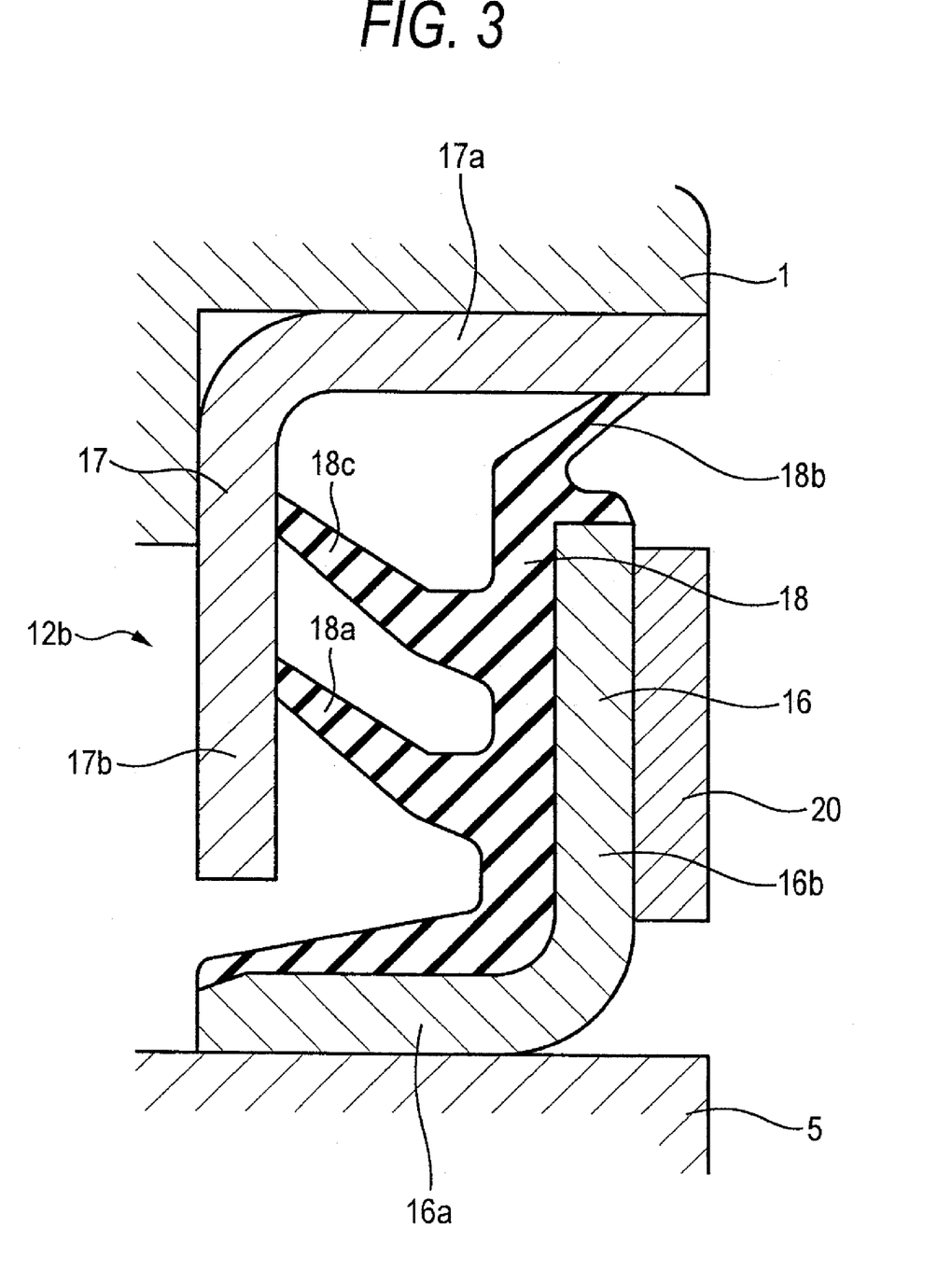
FIG. 3 is a main part cross-sectional view illustrating a first modification of the first embodiment.

For example, as a first modification of the present embodiment, as illustrated in FIG. 3, the rotating-side sealing portion 18 can be further provided with an axial lip 18c slide-contacted with the flange portion 17b of the second slinger 17 in a radially outward direction of the axial lip 18a, in addition to the axial lip 18a and the radial lip 18b, to thereby further enhance the sealability.

Figure 4:
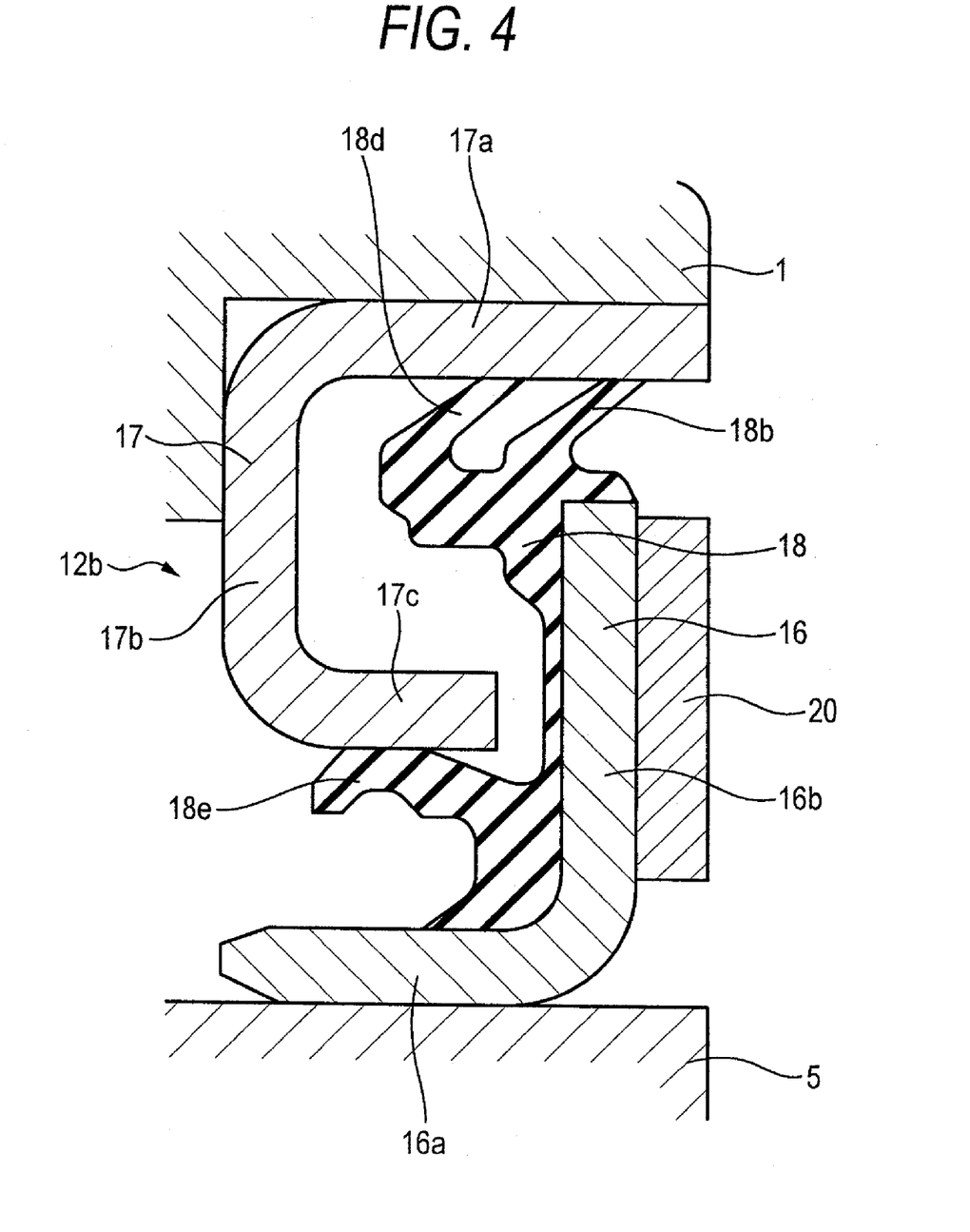
FIG. 4 is a main part cross-sectional view illustrating a second modification of the first embodiment.

Also, as a second modification of the present embodiment, as illustrated in FIG. 4, the rotating-side sealing portion 18 can have three radial lips 18b, 18d, and 18e, which are radially slide-contacted with the second slinger, to thereby enhance the sealability. In the second modification, the second slinger 17 directs an end of the flange portion 17b toward an axial exterior side to thereby form an inner cylindrical portion 17c. The rotating-side sealing portion 18 is configured to have the two radial lips 18b and 18d slide-contacted with an inner circumferential surface of the cylindrical portion 17a and also have the single radial lip 18e slide-contacted with an inner circumferential surface of the inner cylindrical portion 17c.

Figure 5:
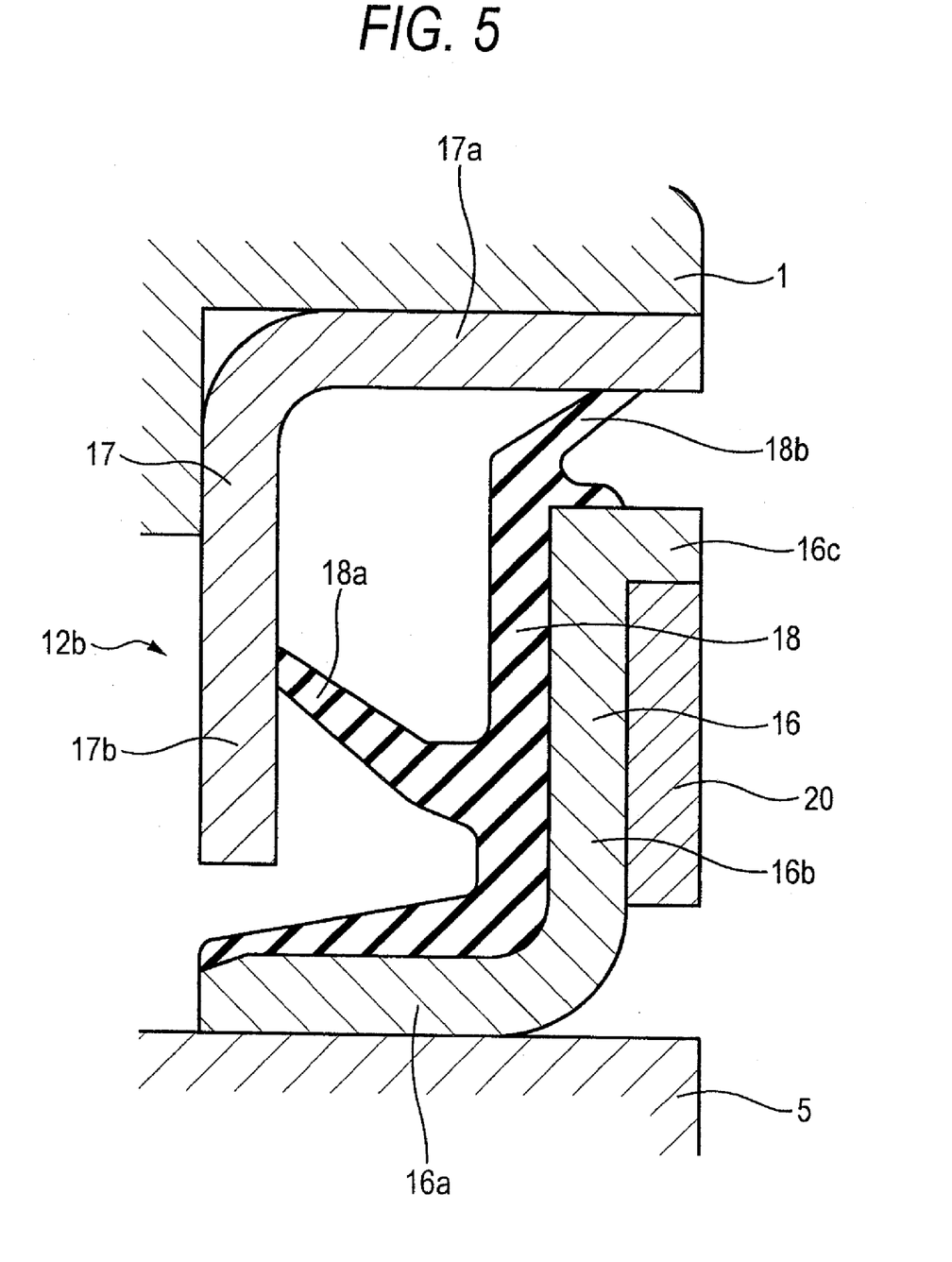
FIG. 5 is a main part cross-sectional view illustrating a third modification of the first embodiment.

Also, as illustrated in FIG. 5, as a third modification of the present embodiment, the rotating-side first slinger 16 can be configured so that an end of the flange portion 16b extends in a radially outward direction, and that a partitioning portion 16c is provided between the magnetic encoder 20 and the rotating-side sealing portion 18. Thus, when the magnetic encoder 20 and the rotating-side sealing portion 18 are simultaneously formed, the partitioning portion 16c prevents the material of the magnetic encoder 20 and the material of the rotating-side sealing portion 18 from flowing out. Consequently, the magnetic encoder 20 and the rotating-side sealing portion 18 can be stably formed and bond-fixed to the first slinger 16. Additionally, in a case where the first slinger 16 is cross-sectionally L-shaped, as illustrated in FIG. 2, preferably, the material of the magnetic encoder 20 and the material of the rotating-side sealing portion 18 are prevented by providing the partitioning portion in a forming die from being mixed with each other.

Second Embodiment

Next, a hub unit bearing according to a second embodiment of the invention is described in detail with reference to FIG. 6. Incidentally, the hub unit gearing according to the present embodiment differs from that according to the first embodiment in a sealing device 12c provided between the inboard-side end portion of the outer ring 1 and the inner ring 5. Thus, each constituent element equivalent to an associated one of the constituent elements of the first embodiment is designated by the same reference numeral as used to denote the associated constituent element. The description of such constituent elements is omitted or simplified.

Figure 6:
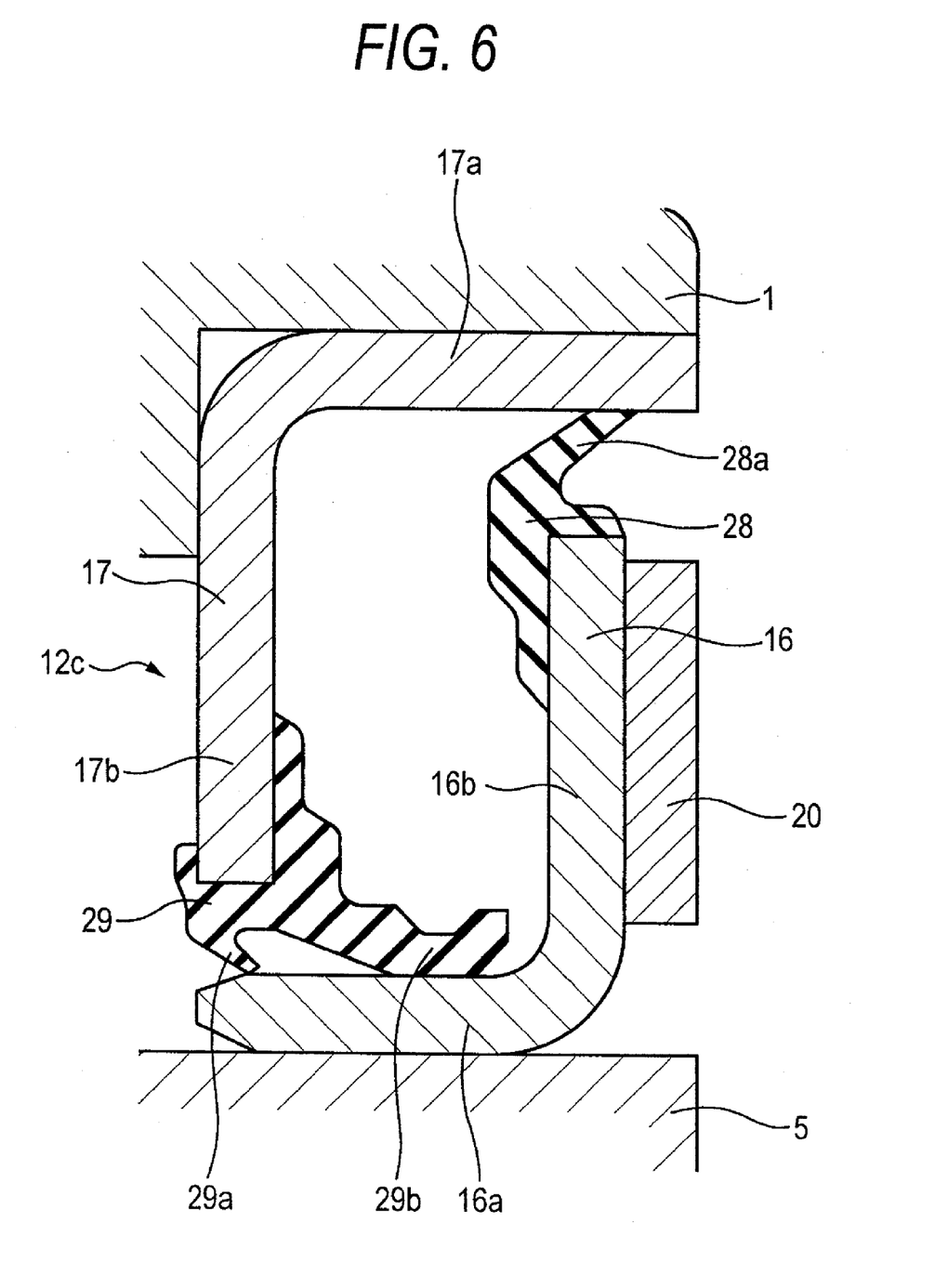
FIG. 6 is a main part cross-sectional view illustrating a sealing device of a hub unit bearing according to a second embodiment of the invention.

The sealing device 12c provided in the hub unit bearing according to the second embodiment has a first slinger 16 fit onto the outer circumferential surface of the inner ring 5, a second slinger 17 fit into the inner circumferential surface of the inboard-side end of the outer ring 1, a magnetic encoder 20 bond-fixed to an axially outward side surface of a flange portion 16b of the first slinger 16, a rotating-side sealing portion 28 which is bond-fixed to the first slinger 16 and is slide-contacted with the second slinger 17, and a fixed-side sealing portion 29 which is bond-fixed to the second slinger 17 and is slide-contacted with the first slinger 16, as illustrated in FIG. 6.

The rotating-side sealing portion 28 is formed of a rubber material and is bond-fixed to an end of the flange portion 16b of the first slinger 16. Further, the rotating-side sealing portion 28 has a radial lip 28a radially slide-contacted with an inner circumferential surface of a cylindrical portion 17a of the second slinger 17.

On the other hand, the fixed-side sealing portion 29 is also formed of a rubber material and is bond-fixed to an end of the flange portion 17b of the second slinger 17. Further, the fixed-side sealing portion 29 has two radial lips 29a and 29b radially slide-contacted with an outer circumferential surface of a cylindrical portion 16a of the second slinger 17.

Also, the single radial lip 28a of the rotating-side sealing portion 28 bond-fixed to the first slinger 16 is brought into sliding-contact with an inner surface of the cylindrical portion 17a of the second slinger 17. Two radial lips 29a and 29b of a fixed-side sealing portion 29 bond-fixed to the second slinger 17 are brought into sliding-contact with an outer circumferential surface of the cylindrical portion 16a of the first slinger 16 thereby to prevent the leakage of the sealed grease and to prevent dust, water, and mud from entering the bearing space 13.

Incidentally, the configurations of the first slinger 16, the second slinger 17, and the magnetic encoder 20, and a direction in which the magnetic encoder 20 is fixed to the first slinger 16, are similar to those of the first embodiment, respectively.

Therefore, according to the second embodiment, the rotating-side sealing portion 28 slide-contacted with the fixed-side second slinger 17 is fixed to the rotating-side first slinger 16, to which the magnetic encoder 20 is fixed, between the first slinger 16 and the second slinger 17 constituting the sealing device 12c. The fixed-side sealing portion 29 slide-contacted with the rotating-side first slinger 17 is fixed to the fixed-side second slinger 17. Thus, the number of lips of the sealing portion can be increased by effectively utilizing the cross-section space of the sealing device 12c without increasing the size of the sealing device 12c. Consequently, the sealability of the sealing device 12c can be enhanced.

Also, the magnetic encoder 20 is fixed to the first slinger 16. The magnetic encoder 20 and the rotating-side sealing portion 28 are bond-fixed to the first slinger 16 with the same adhesive agent. Thus, the rotating-side sealing portion 28 and the magnetic encoder 20 can be simultaneously mold-bonded to each other. Consequently, the number of manufacturing steps can be prevented from being increased by bond-fixing the rotating-side sealing portion 28 to the first slinger 16, to which the magnetic encoder 20 is bond-fixed. Consequently, the manufacturing cost can be suppressed from being increased.

Additionally, the radial lip 28a of the rotating-side sealing portion 28 is mold-bonded to the first slinger 16, to which the magnetic encoder 20 is fixed, to close an external-air-side opening in a sealing device 12c. Thus, mud water or the like can be prevented from entering the space in the sealing devices 12c, as compared with the conventional sealing device 100 shown in FIG. 12. Also, because the radial lip 28a is turned, the effect of shaking off mud water by a centrifugal force can be expected. Sealing performance can be further enhanced.

Incidentally, the description of the present embodiment exemplifies the rotating-side sealing portion 28, in which the single radial lip 28a is provided, and the fixed-side sealing portion 29, in which two radial lips 29a and 29b are provided. The number of the lips of the sealing portion and the shape of each of the lips can variously be changed.

Figure 7:
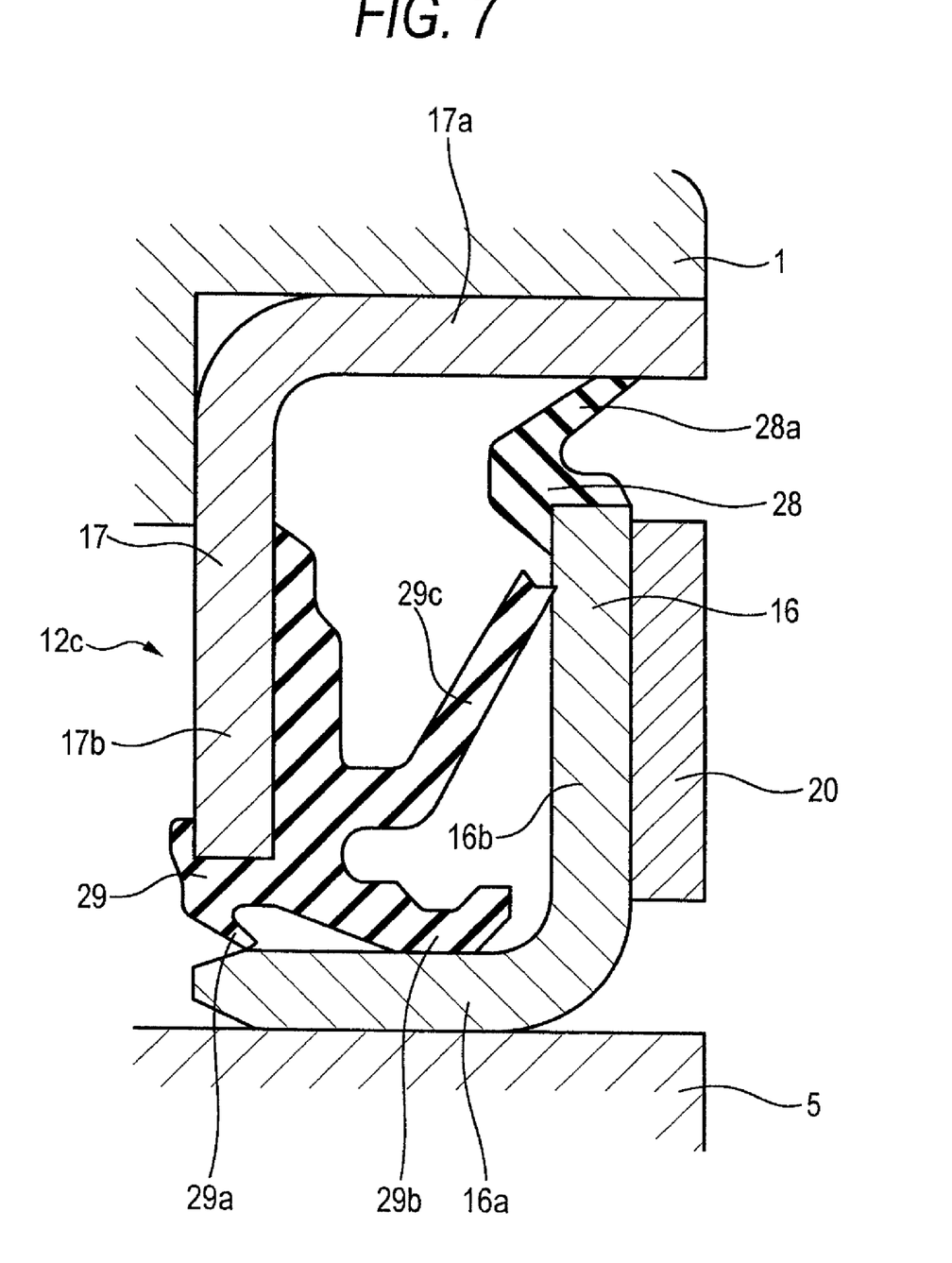
FIG. 7 is a main part cross-sectional view illustrating a first modification of the second embodiment.

For example, as a first modification of the present embodiment, as illustrated in FIG. 7, the fixed-side sealing portion 29 is provided with the single axial lip 29c slide-contacted with an axially inner surface of the flange portion 16b of the first slinger 16, in addition to the two radial lips 29a and 29b. The sealability can be further enhanced.

Figure 8:
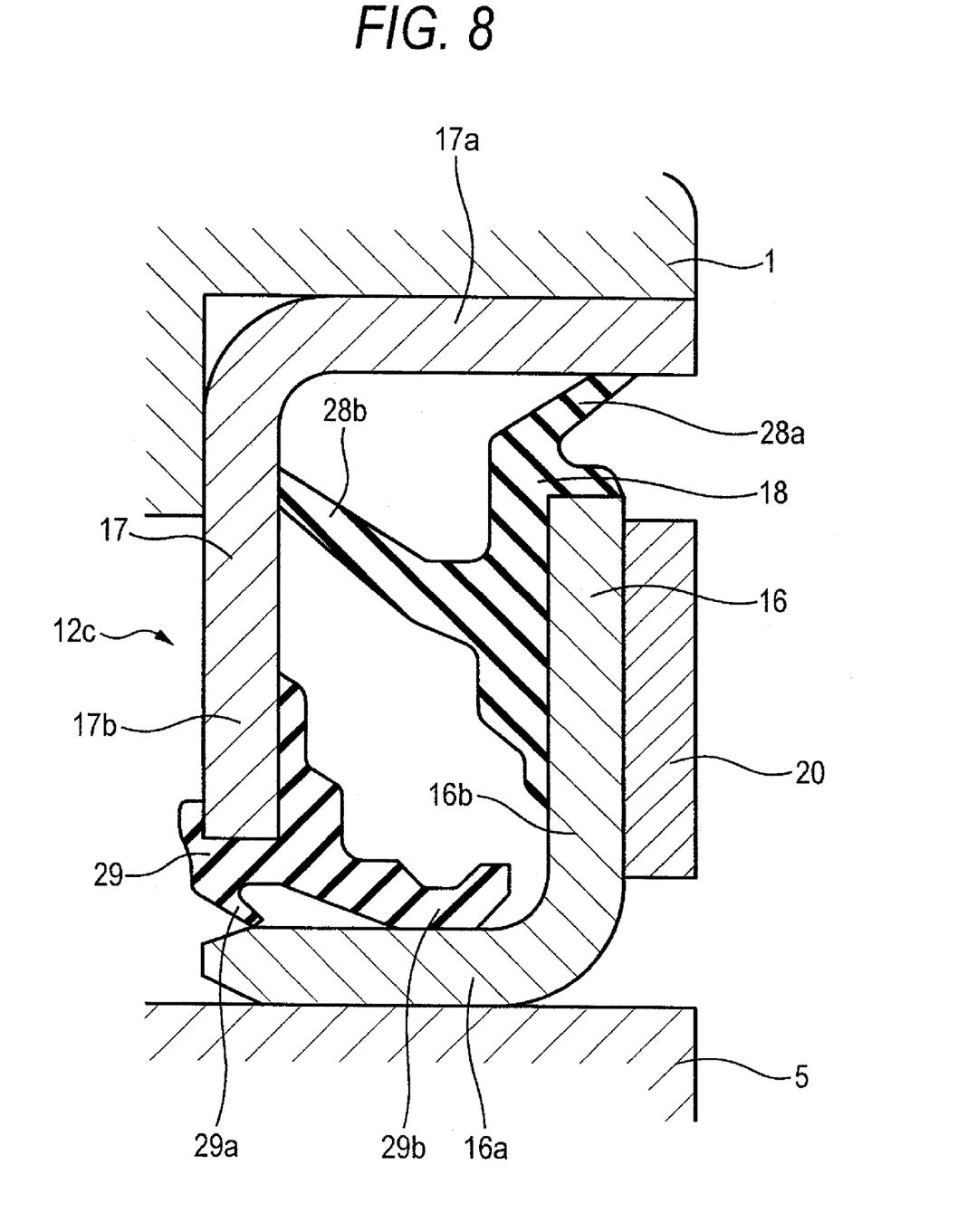
FIG. 8 is a main part cross-sectional view illustrating a second modification of the second embodiment.

Also, as a second modification of the present embodiment, as illustrated in FIG. 8, the rotating-side sealing portion 28 is provided with the single axial lip 28b slide-contacted with an axially outer surface of the flange portion 17b of the second slinger 17, in addition to the single radial lip 28a. The sealability can be further enhanced.

Figure 9:
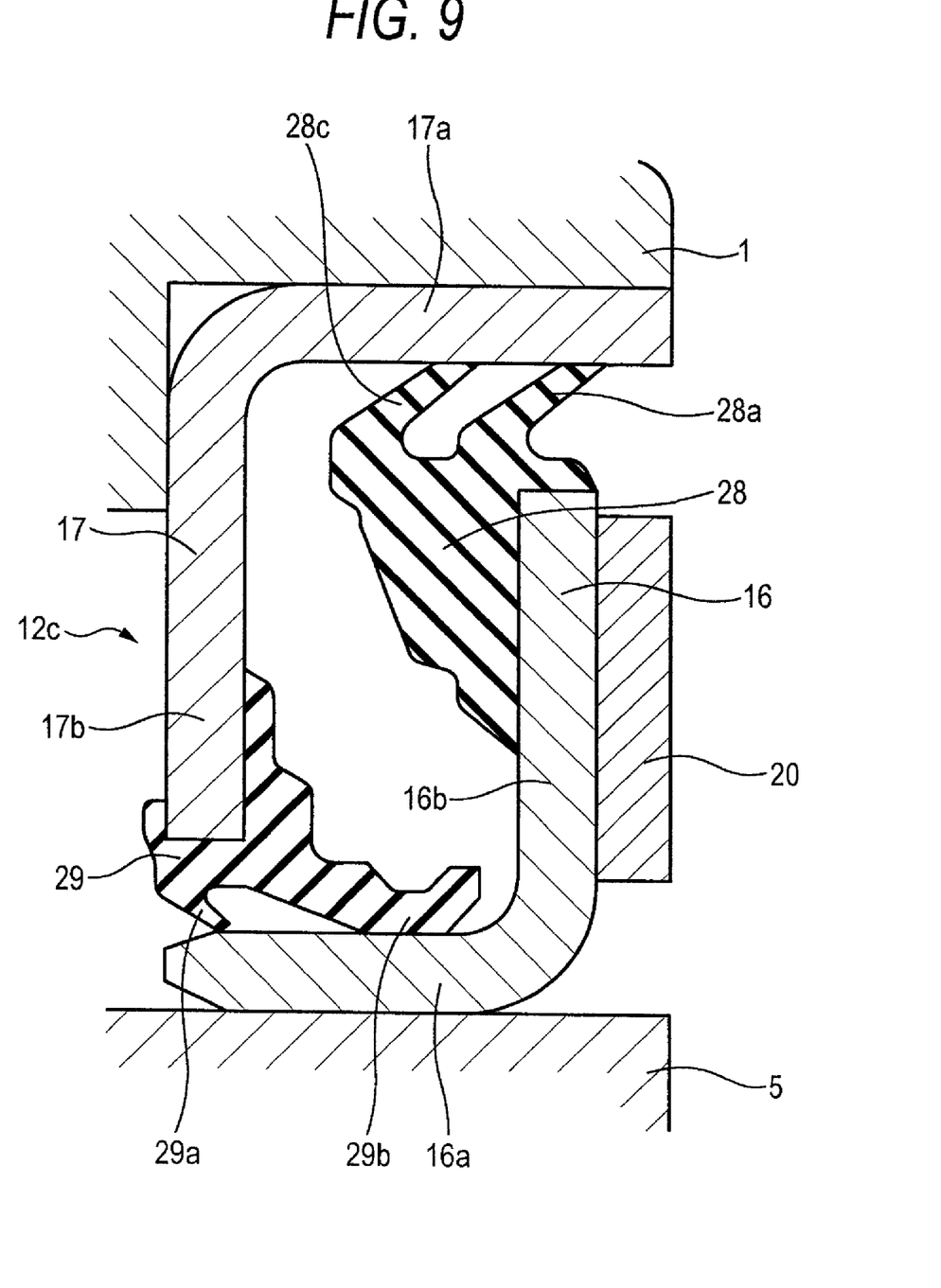
FIG. 9 is a main part cross-sectional view illustrating a third modification of the second embodiment.
Figure 10:
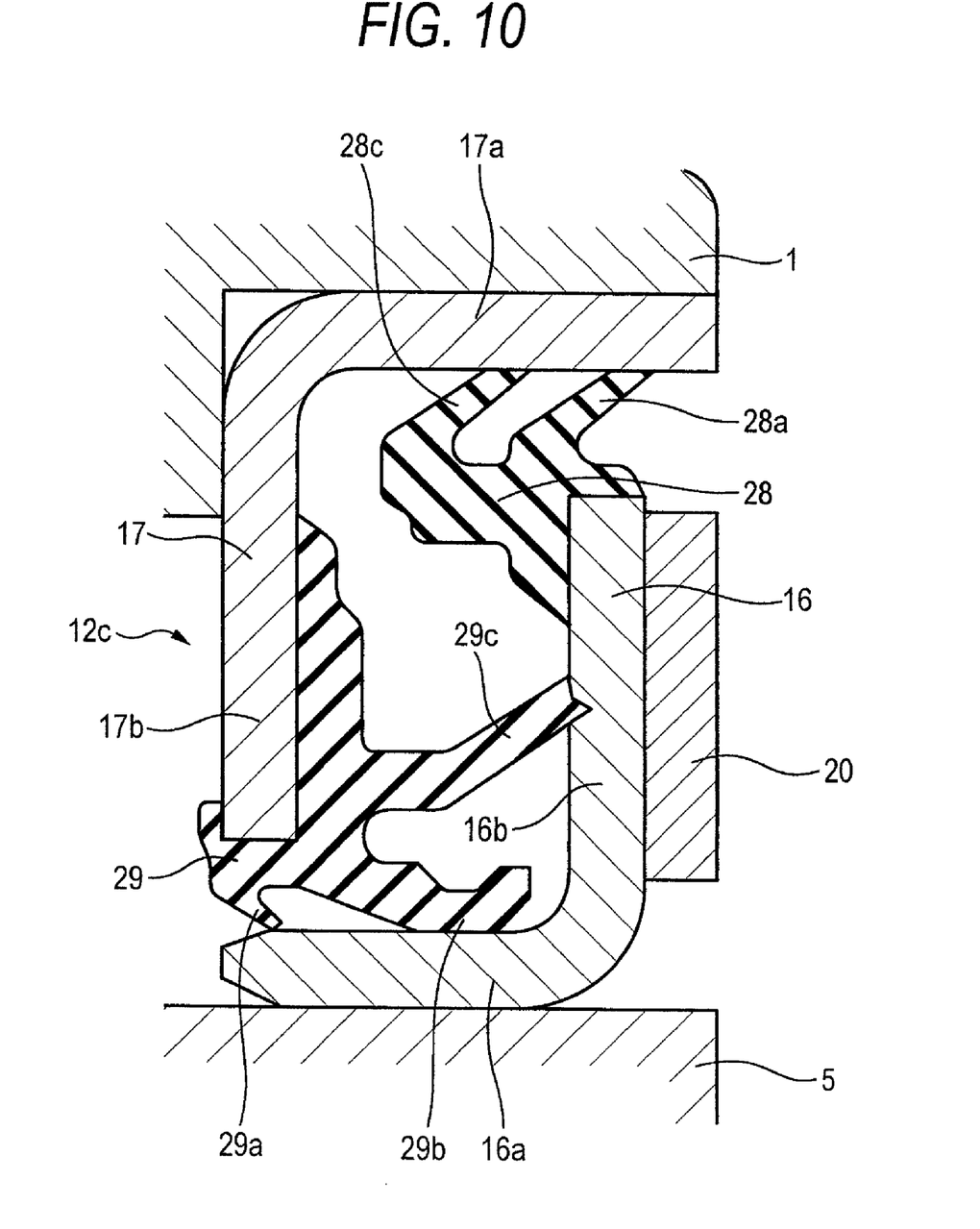
FIG. 10 is a main part cross-sectional view illustrating a fourth modification of the second embodiment.

Additionally, as a third modification of the present embodiment, as illustrated in FIG. 9, the rotating-side sealing portion 28 has the two radial lips 28a and 28c to thereby further enhance the sealability. Further, as a fourth modification of the present embodiment, which is shown in FIG. 10, the sealability can be further enhanced by the two radial lips 28a and 28c of the rotating-side sealing portion 28, the two radial lips 29a and 29b of the fixed-side sealing portion 29, and the single axial lip 29c.

Figure 11:
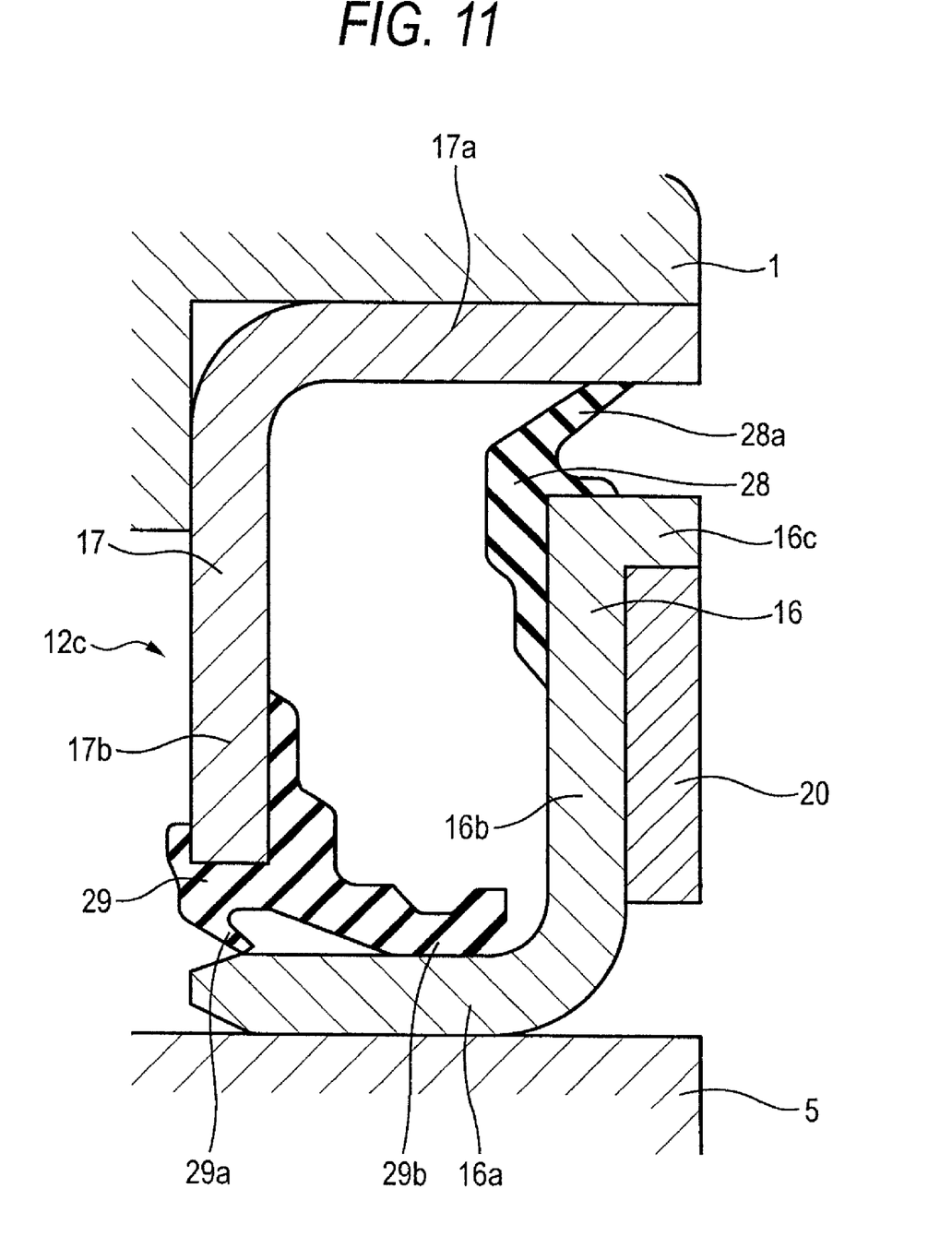
FIG. 11 is a main part cross-sectional view illustrating a fifth modification of the second embodiment.

Also, as illustrated in FIG. 11, as a fifth modification of the present embodiment, the rotating-side first slinger 16 can be configured so that an end of the flange portion 16b extends toward an axially outer side to provide the partitioning portion 16c between the magnetic encoder 20 and the rotating-side sealing portion 28. Thus, when the magnetic encoder 20 and a rotating-side sealing portion 28 are simultaneously formed, the material of the magnetic encoder 20 and the material of the rotating-side sealing portion 28 are prevented by the partitioning portion 16c from flowing out. Consequently, the magnetic encoder 20 and the rotating-side sealing portion 28 can be stably formed and bond-fixed to the first slinger 16. Additionally, in a case where the first slinger 16 is cross-sectionally L-shaped, as illustrated in FIG. 2, preferably, the material of the magnetic encoder 20 and the material of the rotating-side sealing portion 28 are prevented by providing the partitioning portion in a forming die from being mixed with each other.

Incidentally, the invention is not limited to the aforementioned embodiments. The invention can appropriately be changed without departing from the spirit and scope of the invention.

The rotating-side sealing portions 18 and 28 bonded to the rotating-side first slinger 16, the magnetic encoder 20, and the fixed-side sealing portion 29 bond-fixed to the fixed-ring-side second slinger 17 can be fixed to the first and second slingers 16 and 17, respectively, by adding fixing means other than adhesive agents thereto on the condition that the adhesive agents are used.

Additionally, the description of the embodiments exemplifies a case that the invention is applied to an inner ring rotation type hub unit bearing for a driving-wheel. Instead of this, the invention can be applied to an inner ring rotation type hub unit bearing for a driven wheel, an outer ring rotation type hub unit bearing for a driven wheel, and an outer ring rotation type hub unit bearing for a driving wheel.

This application claims priority from Japanese Patent Application Nos. 2005-036274 filed on Feb. 14, 2005, and 2005-036275 filed Feb. 14, 2005, which is hereby incorporated by reference herein in its entirety.

The invention claimed is:

1. A hub unit bearing comprising:
a rotating ring;
a fixed ring;
a plurality of rolling elements rollably disposed in an annular space between the rotating ring and the fixed ring;
a sealing device configured to seal the annular space; and
a magnetic encoder configured to rotate together with the rotating ring, the magnetic encoder being made of rubber or resin material by compression molding,
wherein the sealing device comprises:
a first slinger fixed to the rotating ring;
a second slinger fixed to the fixed ring; and
a rotating-side sealing portion which is fixed to a first face of the first slinger and having at least one lip which is slide-contacted with the second slinger, the rotating-side sealing portion being made of rubber material by injection molding, wherein:
the magnetic encoder is fixed to a second face of the first slinger opposite the first face,
the magnetic encoder and the rotating-side sealing portion are bond-fixed to the first slinger with a same adhesive agent,
a radially outermost end of the magnetic encoder is separated radially inward from a radially outermost end of the first slinger, and
a portion of the rotating-side sealing portion directly opposite a portion of the second face between the radially outermost end of the magnetic encoder and the radially outermost end of the first slinger has a flat face parallel to the second face and has no lip.

2. The hub unit bearing according to claim 1,
wherein the sealing device further comprises a fixed-side sealing portion which is fixed to the second slinger and which is slide-contacted with the first slinger.

3. The hub unit bearing according to claim 1, wherein the adhesive agent is a phenolic vulcanized adhesive agent.

4. A method for manufacturing a hub unit bearing which comprises:
a rotating ring;
a fixed ring;
a plurality of rolling elements rollably disposed in an annular space between the rotating ring and the fixed ring;
a sealing device configured to seal the annular space; and
a magnetic encoder configured to rotate together with the rotating ring,
wherein the sealing device comprised
a first slinger fixed to the rotating ring;
a second slinger fixed to the fixed ring;
a rotating-side sealing portion which is fixed to a first face of the first slinger and having at least one lip which is slide-contacted with the second slinger, wherein:
the magnetic encoder is fixed to a second face of the first slinger opposite the first face,
the magnetic encoder is made of rubber or a resin material and the rotating-side sealing portion is made of rubber material, and
the magnetic encoder and the rotating-side sealing portion are bond-fixed to the first slinger with a same adhesive agent,
the method comprising:
forming the magnetic encoder by a compression molding such that a partitioning portion of a forming die is provided between a radially outermost end of the magnetic encoder and a radially outermost end of the first slinger to prevent the material of the magnetic encoder and the material of the rotating-side sealing portion from being mixed; and
forming the rotating-side sealing portion by an injection molding such that a portion of the rotating-side sealing portion directly opposite a portion of the second face between the radially outermost end of the magnetic encoder and the radially outermost end of the first slinger has a flat face parallel to the second face and has no lip.

* * * * *